July 8, 1947. J. R. HENDERSON 2,423,703
LIFT TRUCK
Filed Feb. 1, 1945 2 Sheets-Sheet 1
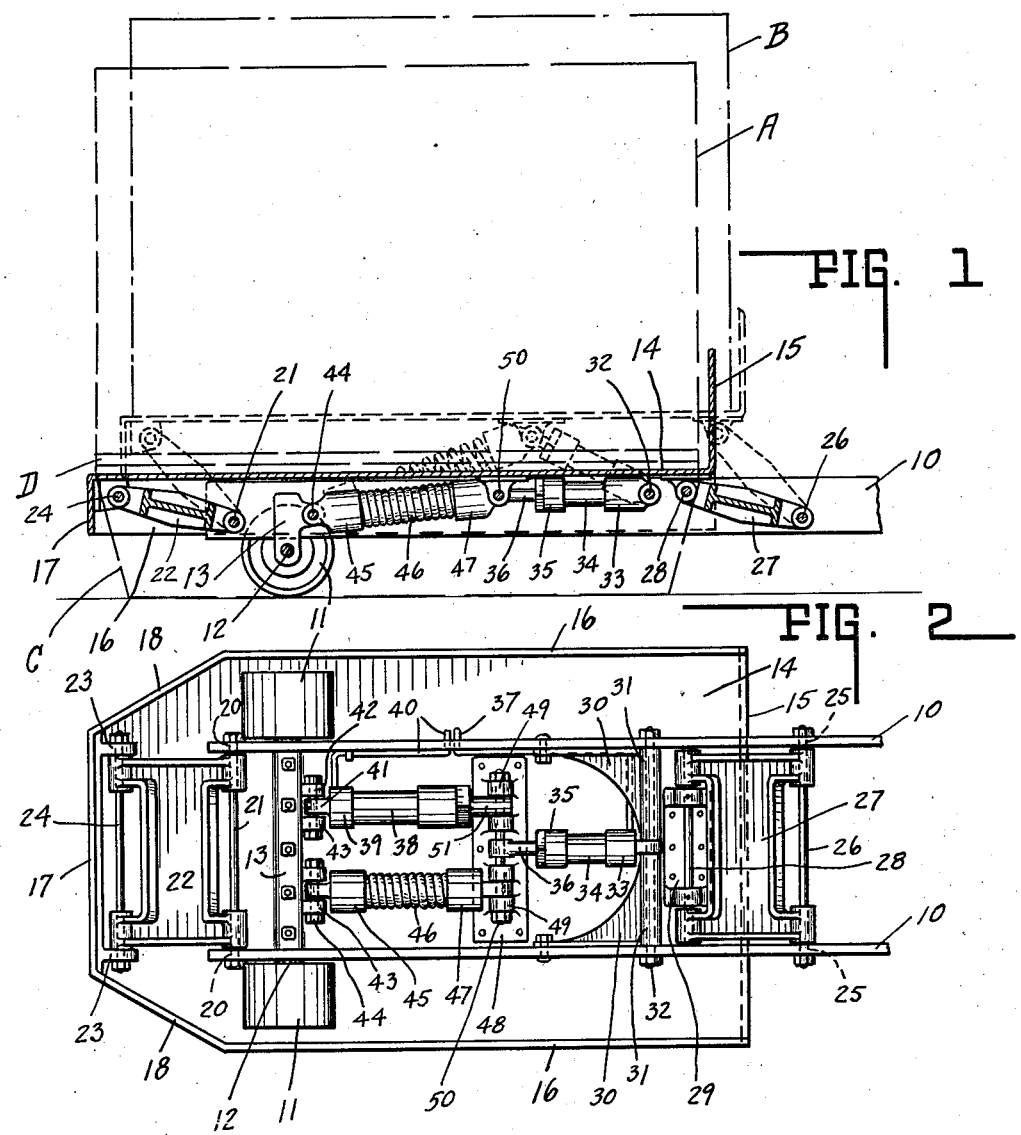
INVENTOR.
JOHN R. HENDERSON.
BY
Lockwood, Goldsmith & Galt,
ATTORNEYS.

July 8, 1947.                J. R. HENDERSON                2,423,703
                                LIFT TRUCK
                           Filed Feb. 1, 1945            2 Sheets-Sheet 2
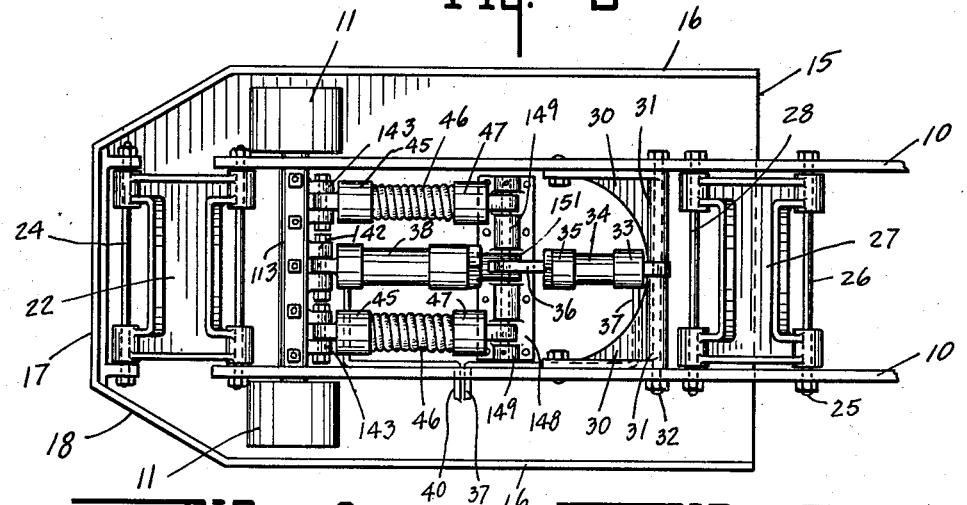
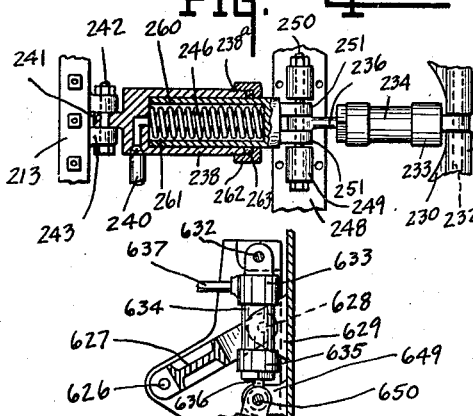
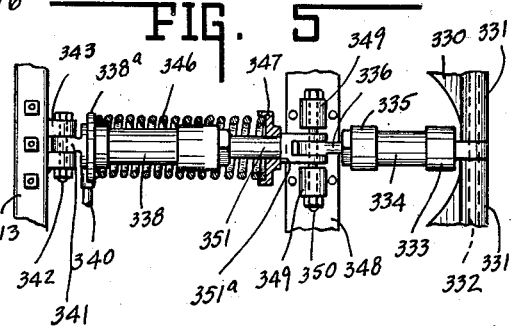
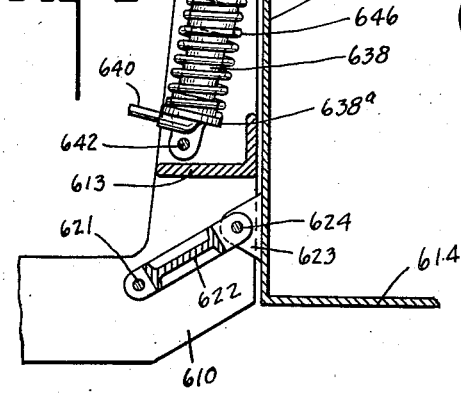
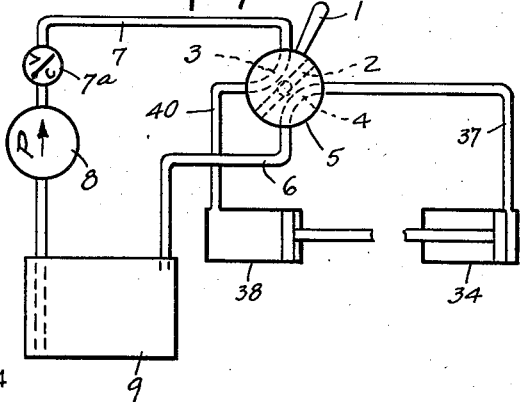
INVENTOR.
JOHN R. HENDERSON.
BY
Lockwood, Goldsmith & Galt.
ATTORNEYS.

Patented July 8, 1947

2,423,703

UNITED STATES PATENT OFFICE 2,423,703

LIFT TRUCK

John R. Henderson, Indianapolis, Ind.

Application February 1, 1945, Serial No. 575,713

11 Claims. (Cl. 254—10)

1

This invention relates to a relatively movable platform or like including a portable truck, the platform portion being manually movable into elevated and lowered position.

The chief object of this invention is to provide an auxiliary spring or springs, normally directed to raise a certain portion of the gross weight of a load and elevating platform of a portable truck in association with means for positively raising and, if desired, lowering of the platform and load relative to the truck body. Usually this spring force is about half the total force required to elevate the maximum load. The result is that the amount of effort necessary to elevate a load is materially reduced and/or the time required therefor.

Herein the invention is disclosed as embodied in a truck wherein the means for positively raising and lowering of the platform and load is of the fluid pressure operable type.

The chief feature of this invention resides in associating with a lifting and lowering portion, such as a platform, of a truck of the character described, a spring means arranged when released to assist other lifting means in load elevation. In lowering another means is effective to restore the spring means so same can be held in the preloaded condition.

Other objects and features of the invention will be set forth more fully hereinafter.

The full nature of the invention will be understood from the accompanying drawings and the following description and claims:

In the drawings,

Fig. 1 is a longitudinal sectional view through the elevating end of a truck, the hydraulic pump, reservoir, pump operating means, and truck guiding means being omitted, dotted lines indicating parts in an elevated position, the load in the loading and elevated positions also being shown dotted and designated by letters A and B respectively.

Fig. 2 is a bottom plan view of those portions of the truck shown in Fig. 1.

Fig. 3 is a view similar to Fig. 2 and of a multi-spring embodiment of the invention.

Fig. 4 is a bottom plan view of a portion of a modified form of the invention, with parts in section; this form being of the type wherein the spring means is contained within the hydraulic means.

Fig. 5 is a similar view of a modified form of the invention wherein the spring means envelopes the hydraulic means.

Fig. 6 is a vertical sectional view of a further

2 form of the invention and of the vertical power type, and in the elevated position.

Fig. 7 is a diagrammatic view of the hydraulic control system utilized.

In Figs. 1 and 2 of the invention 10 indicates a pair of frame members of a portable truck provided with suitable wheel means fore and aft, the latter only being illustrated herein and designated by numeral 11. These wheels are supported on axle 12 suitably mounted in bearing means 13 carried by the frame.

The platform herein includes base 14 and riser portion 15. It is defined by depending side flanges 16 and rear flange 17 and may be mitred at the corners as at 18 to facilitate platform entrance between runners C of the skid having platform D supporting load A, such as a pile of tin plate sheets. The clearance between the supporting surface and under face of this skid platform is such to permit truck platform positioning therebetween and the runner spacing is sufficient to permit such platform positioning. This is old in the art.

Pivoted at 20 in frame 10 upon member 21 is a rigid link member 22. The platform 14 includes bearings 23 for member 24 that pivotally connects member 22 to said platform.

Pivoted at 25 in the frame 10 upon member 26 is a similar rigid link member 27 that is associated with member 28 carried by bearing structure 29 in turn carried by platform 14. Note that the link members 22 and 27 are interchangeable and constitute a parallel motion device.

Herein frame 10 is braced by plates 30 provided with aligned bearings 31 and member 32 therein between said plates pivotally supports the head 33 of a power cylinder 34 having head 35 from which projects piston rod 36. Within this cylinder is a power piston. Fluid under pressure is supplied to said cylinder by line 37 and at head 33.

Another cylinder 38 includes head 39 connected to pressure supply line 40 and having pivot bearing 41 carried by pivot 42 in turn carried by bearings 43 upon portion 13.

Similar bearings 43 support pivot 44, in turn pivotally supporting cup 45 seating one end of spring 46, the other end of which is seated in a similar but oppositely directed cup 47.

Member 48 suitably secured to platform 14 provides aligned bearings 49 that support member 50 which pivotally connects cup 47, rod 36 and rod 51 to the platform. Rod 51 mounts a piston (not shown) in cylinder 38. Rod 36 mounts a piston (not shown) in cylinder 34.

Operation is as follows: With pressure in piston 34, the spring 46, see Fig. 1, is loaded for about half the total lifting force required for load and platform elevation to the dotted line position. When the pressure is released, the force of spring 46 is released for load elevation.

Additional power then supplied by fluid pressure applied to cylinder 38 elevates the load, etc., to the dotted line position. When the load is elevated, the truck is moved with the load to the new location. Then the pressure is released from cylinder 38 and the load and platform is lowered by gravity, the spring 46 serving as a cushion or shock absorber.

If the weight of the load is insufficient to overcome the spring, fluid pressure is supplied to cylinder 34. In any event pressure must be supplied thereto to finally compress spring 46 and hold same compressed so that the truck platform under the skid base is free of the latter for truck withdrawal. Pressure is retained in cylinder 34 to hold spring 46 loaded so that platform 14 can be positioned beneath another skid whereupon the pressure in cylinder 34 is released and the cycle aforesaid is repeated.

As previously stated, the force of spring 46 is sufficient to handle approximately half the maximum load capacity of the truck. Whenever the load is less than that of the spring load, elevation is solely by pressure release in cylinder 34 and release of spring force. Platform lowering in this event, to effect load lowering, is effected by pressure application to cylinder 34, in addition to the weight of the load, sufficient to overcome the spring force and return the spring to the full line position, see Fig. 1, and hold same therein.

Reference will now be had to Fig. 3 wherein like parts have like designating numerals and similar parts are designated by numerals of the one hundred series similar to corresponding part designating numerals of primary series.

The only different parts herein are portion 113 with three pairs of bearings, two designated by numerals 143 and the intermediate pair by numerals 142 and portion 148 with spaced bearings 149, the outermost pair being positioned near the ends of member 148 and the inner pair being somewhat elongated. Herein also rod 151 is bifurcated and straddles rod 36.

Herein the power cylinder 38 is aligned with power cylinder 34 and two spring structures 46, etc., are provided one at each side of power cylinder 38. This is a better balanced arrangement and the two springs 46 each may have half the force of the single spring 46 in Figs. 1 and 2 with the resulting equal capacity structure, or each have the capacity of spring 46 in said Figs. 1 and 2 whereupon spring force will be twice that of Figs. 1 and 2 structure.

In Fig. 4, a modified form of the invention is illustrated. In this form the two cylinders again are aligned as in Fig. 3, but this form differs from those illustrated in Figs. 1 to 3 in that the power spring is coaxial with the cylinder and not laterally offset therefrom as in the aforesaid forms. Herein the spring is cylinder enclosed. The form shown in Fig. 5 is similar, except therein the spring envelopes the cylinder. Numerals of the two hundred series and numerals of the three hundred series in Figs. 4 and 5, respectively, designate parts similar or like those in Figs. 1 to 3.

In Fig. 4 the cylinder 238 telecopes a bored piston 260 bored at 261 to seat spring 246. The free end of cylinder 238 is threaded at 238a and cap 262 threads thereon and retains packing 263 and passes piston 260 provided with spaced ears 251 by which same is pivoted to the platform through member 250 in bearings 249 on plate 248. Operation of this embodiment is identical to that previously described.

In Fig. 5, the power cylinder head 338 includes spring seat extension 338a. The piston rod 351 is shouldered at 351a and bearing thereagainst is cup 347 retaining the other end of spring 346, which herein envelopes the power cylinder 338. The piston rod 351 is bifurcated and retained by member 350 in bearings 349 in plate 348 secured to the platform. The operation of this form is identical to that previously described.

Reference will now be had to Fig. 6 wherein a vertical embodiment is illustrated in the elevated position. Herein 610 indicates a portable frame, 614 a platform base, and 615 a riser rigid therewith, the same being connected to the frame by links 622 and 627 at 621 and 626, respectively, and to the movable element as at 623—624 and 628—629 as illustrated.

For purposes of illustration only, the form illustrated in Fig. 5 is embodied in Fig. 6, although it is to be understood that any of the other forms previously illustrated may be employed. Numerals of the 600 series indicate parts like or corresponding to parts in Fig. 5 designated by corresponding 300 series numerals. Operation of this form is identical to that previously described.

In Fig. 7 there is diagrammatically illustrated one form of hydraulic control system, same being associated with pressure supply and release lines 37 and 40. Herein 9 indicates a reservoir; 8 a pump included in line 7 with check valve 7a downstream of the pump. A return line 6 leads to the reservoir from a valve unit.

This valve unit includes a valve 5 therein with arcuate passages 3 and 4 therethrough and diametral passage 2 therebetween. Handle 1 is arranged to shift the valve 5. When the valve 5 is positioned as illustrated, pressure is supplied to cylinder 38 and pressure is released from cylinder 34 to the reservoir to raise the platform and load. The degree of port registration can control the force application.

When it is desired to forthwith release the load for gravity lowering, passage 2 is registered with lines 37 and 40 and fluid flows from cylinder 38 to cylinder 34. When the platform and load are auxiliary spring means supported, handle 1 is further turned to connect cylinder 34 and line 37 to pressure line 7 and cylinder 38 and line 40 to return line 6. Pressure from line 7 now actuates the piston in cylinder 34 to load the auxiliary spring means as described.

When the load is to be elevated it can be released to the spring means by registering passage 2 with lines 37 and 40 and then by registering lines 7 and 6 with cylinders 38 and 34, respectively, or moving immediately to the latter position.

While the invention has been illustrated and described in great detail in the drawings and foregoing description, the same is to be considered as illustrative and not restrictive in character.

The several modifications described herein as well as others which will readily sugest themselves to persons skilled in this art, all are considered to be within the broad scope of the invention, reference being had to the appended claims.

The invention claimed is:

1. In a truck structure having a supporting base means and load lifting means operatively connected together, the combination of a pair of opposed fluid pressure operable means each having the remote end thereof connected to one means and the other end of said fluid pressure operable means connected to the other of the said two first mentioned means and spring power means operatively interposed between the two first mentioned means and normally opposing one of the pressure operable means and assisting the other of said pressure operable means.

2. Structure as defined by claim 1 wherein the spring power means and one of the fluid pressure operable means are parallel to each other.

3. Structure as defined by claim 1 wherein the spring power means is of dual character.

4. Structure as defined by claim 1 wherein the spring power means is of dual character and parallel to one of the fluid pressure operable means, the latter being therebetween.

5. Structure as defined by claim 1 wherein the spring power means is of dual character and parallel to one of the fluid pressure operable means, the latter being therebetween and in longitudinal alignment with the other fluid pressure operable means.

6. Structure as defined by claim 1 wherein the two fluid pressure operable means are longitudinally aligned.

7. Structure as defined by claim 1 wherein the spring power means envelopes one of the fluid pressure operable means.

8. Structure as defined by claim 1 wherein the spring power means envelopes one of the fluid pressure operable means and both pressure operable means are longitudinally aligned.

9. Structure as defined by claim 1 wherein the spring power means is enclosed within one of the fluid pressure operable means.

10. Structure as defined by claim 1 wherein the spring power means is enclosed within one of the fluid pressure operable means and both pressure operable means are longitudinally aligned.

11. Structure as defined by claim 1 wherein the adjacent ends of the fluid pressure operable means have a common pivotal connection with the said other means.

JOHN R. HENDERSON.

REFERENCES CITED

The following references are of record in the file of this patent:

UNITED STATES PATENTS

| Number | Name | Date |
| --- | --- | --- |
| 2,200,392 | Goldberg | May 14, 1940 |
| 1,074,753 | Smouse | Oct. 7, 1913 |